United States Patent
Minematsu et al.

(10) Patent No.: US 11,029,621 B2
(45) Date of Patent: Jun. 8, 2021

(54) CONDUCTIVE ROLL FOR ELECTROPHOTOGRAPHIC DEVICE

(71) Applicant: Sumitomo Riko Company Limited, Aichi (JP)

(72) Inventors: Kosuke Minematsu, Aichi (JP); Yutaka Kadoshima, Aichi (JP); Yasunori Nimura, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 16/987,361

(22) Filed: Aug. 6, 2020

(65) Prior Publication Data

US 2020/0363748 A1 Nov. 19, 2020

Related U.S. Application Data

(63) Continuation of application No. PCT/JP2019/005752, filed on Feb. 18, 2019.

(30) Foreign Application Priority Data

Mar. 30, 2018 (JP) .............................. JP2018-067039

(51) Int. Cl.
*G03G 5/10* (2006.01)
*G03G 15/02* (2006.01)
(Continued)

(52) U.S. Cl.
CPC .......... *G03G 15/0233* (2013.01); *G03G 5/104* (2013.01); *G03G 5/105* (2013.01); *G03G 15/0818* (2013.01); *G03G 15/162* (2013.01)

(58) Field of Classification Search
CPC .......... G03G 15/0233; G03G 15/0808; G03G 15/162; G03G 15/2053; G03G 15/206;
(Continued)

(56) References Cited

U.S. PATENT DOCUMENTS

2011/0183080 A1   7/2011   Kawamura et al.
2018/0194916 A1*  7/2018   Yamaoka ................ C08L 83/04

FOREIGN PATENT DOCUMENTS

JP   2009086645   4/2009
JP   2011150296   8/2011
(Continued)

OTHER PUBLICATIONS

"Written Opinion of the International Searching Authority (Form PCT/ISA/237) of PCT/JP2019/005752," dated Mar. 19, 2019, with English translation thereof, pp. 1-12.
(Continued)

*Primary Examiner* — Peter L Vajda
(74) *Attorney, Agent, or Firm* — JCIPRNET

(57) ABSTRACT

A conductive roll for electrophotographic device is provided. The conductive roll for electrophotographic device 10 includes a shaft body 12 and a non-foamed elastic body layer 14 formed on an outer periphery of the shaft body 12. The elastic body layer 14 is made of a cross-linked product of a silicone rubber composition containing the following (a) to (d), and a secondary particle diameter of the following (d) in the elastic body layer 14 is within a range of 100 to 500 nm. (a) is an organopolysiloxane, (b) is a crosslinking agent, (c) is a microcapsule catalyst made of fine resin particles which encapsulate a crosslinking catalyst by a resin other than a silicone resin, and (d) is silica with a BET specific surface area of 70 to 350 m²/g.

1 Claim, 1 Drawing Sheet

(a)

(b)

(51) Int. Cl.
*G03G 15/08* (2006.01)
*G03G 15/16* (2006.01)

(58) Field of Classification Search
CPC ........... G03G 15/2089; G03G 15/1685; G03G 2215/2051
See application file for complete search history.

(56) References Cited

FOREIGN PATENT DOCUMENTS

| | | |
|---|---|---|
| JP | 2012027122 | 2/2012 |
| JP | 2012083672 | 4/2012 |
| WO | 2017094703 | 6/2017 |

OTHER PUBLICATIONS

"International Search Report (Form PCT/ISA/210) of PCT/JP2019/005752," dated Mar. 19, 2019, withEnglish translation thereof, pp. 1-4.

* cited by examiner (a)
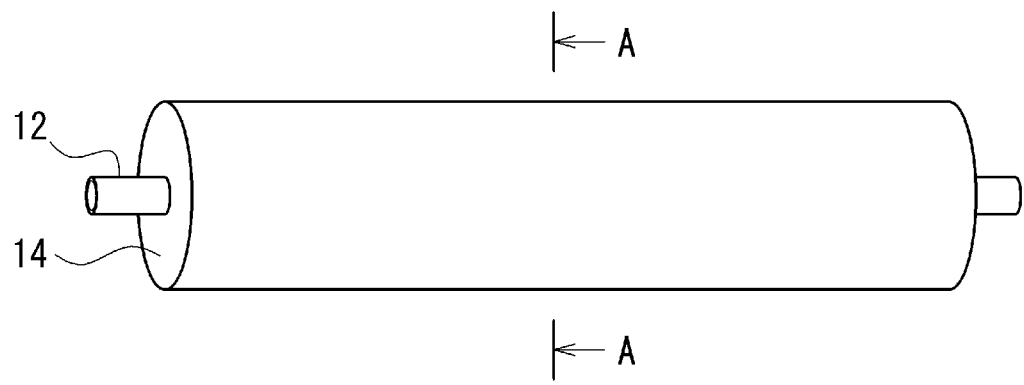
(b)
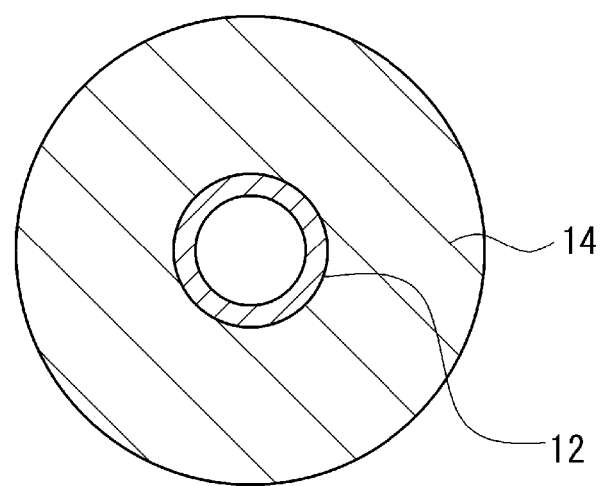

CONDUCTIVE ROLL FOR ELECTROPHOTOGRAPHIC DEVICE

CROSS-REFERENCE TO RELATED APPLICATION

This application is a continuation application of International Application number PCT/JP2019/005752 on Feb. 18, 2019, which claims the priority benefit of Japan Patent Application No. 2018-067039, filed on Mar. 30, 2018. The entirety of each of the above-mentioned patent applications is hereby incorporated by reference herein and made a part of this specification.

BACKGROUND

Technical Field

The present disclosure relates to a conductive roll for electrophotographic device which is suitably used in an electrophotographic device such as a copying machine, a printer, or a facsimile which employs electrophotography, and the present disclosure relates to a method for manufacturing the conductive roll for electrophotographic device.

Related Art

In an electrophotographic device such as a copying machine, a printer, or a facsimile which employs electrophotography, a conductive roll such as a charging roll, a developing roll, a transfer roll, a toner supply roll or the like is used. The conductive roll of the electrophotographic device has a conductive elastic body layer on an outer periphery of a shaft body. Silicone rubber may be used as a base material of the elastic body layer.

LITERATURE OF RELATED ART

[Patent Literature]
Patent literature 1: International Publication No. 2017/094703

If an outer diameter of an end portion of the elastic body layer of the conductive roll is greater than an outer diameter of a center portion, tackiness with a mating member with which the conductive roll contacts at the end portion becomes high, and chattering vibration occurs. Accordingly, there is a possibility that density unevenness of an image may occur. To prevent the outer diameter of the end portion of the elastic body layer from increasing, for example, it is necessary to lower a molding temperature of the elastic body layer so as to reduce a deviation between a material temperature during curing and a temperature during use to reduce a heat shrinkage amount of the material.

For example, in Patent literature 1, there is a technique for low-temperature molding in emulsion foaming of silicone rubber, and it is described that a microcapsule catalyst made of fine resin particles encapsulating a crosslinking catalyst is used as a crosslinking catalyst for the silicone rubber. Accordingly, the molding temperature can be set equal to or less than a boiling point at which water does not evaporate.

The resin covering the crosslinking catalyst of the above-described microcapsule catalyst may be a resin having low compatibility with the silicone rubber so that the crosslinking catalyst does not diffuse into the silicone rubber during storage before use. Then, there is a possibility that dispersibility of the microcapsule catalyst becomes low in a silicone rubber composition, and variation may occur in hardness after curing.

The problem to be solved by the present disclosure is to provide a conductive roll for electrophotographic device in which swelling of product end portion and variation of product hardness are suppressed and fluidity and storage stability of a material before curing are excellent, and to provide a method for manufacturing the conductive roll for electrophotographic device.

SUMMARY

The conductive roll for electrophotographic device according to the present disclosure includes a shaft body and a non-foamed elastic body layer formed on an outer periphery of the shaft body, wherein the elastic body layer is made of a cross-linked product of a silicone rubber composition containing the following (a) to (d), and a secondary particle diameter of the following (d) in the elastic body layer is within a range of 100 to 500 nm.

(a) an organopolysiloxane
(b) a crosslinking agent
(c) a microcapsule catalyst made of fine resin particles which encapsulate a crosslinking catalyst by a resin other than a silicone resin
(d) silica having a BET specific surface area of 70 to 350 $m^2/g$ The resin in the above-described (c) is preferably a thermosetting resin. The resin in the above-described (c) is preferably at least one resin of a polyvinyl butyral resin, an epoxy resin, and an acrylic resin. The above-described (d) preferably has a dimethylsilyl group or a trimethylsilyl group on a surface. A content of the above-described (d) is preferably within a range of 3.0 to 35 parts by mass with respect to 100 parts by mass of the above-described (a).

Besides, in the method for manufacturing the conductive roll for electrophotographic device according to the present disclosure, a molding temperature for molding the cross-linked product of the silicone rubber composition is within a range of 80 to 130° C., and a molding time is within a range of 5 to 100 seconds.

BRIEF DESCRIPTION OF THE DRAWINGS (a) of FIG. 1 is an external schematic diagram of a conductive roll for electrophotographic device according to one embodiment of the present disclosure, and (b) of FIG. 1 is a cross-sectional view taken along line A-A.

DESCRIPTION OF THE EMBODIMENTS

According to the conductive roll for electrophotographic device of the present disclosure, the elastic body layer is made of the cross-linked product of the silicone rubber composition containing the above (a) to (d), in the silicone rubber composition containing the above-described (a) to (d), (d) has a specified BET specific surface area, and (d) has a specified secondary particle diameter in the elastic body layer. Therefore, the swelling of the product end portion and the variation of the product hardness can be suppressed, and the fluidity and the storage stability of the material before curing are excellent.

Besides, in the case that when the resin in the above-described (c) is a thermosetting resin, a decrease in compression permanent set deformation of the elastic body layer caused by the resin in the above-described (c) is suppressed, and resistance to deterioration is improved. Besides, in the case that when the resin in the above-described (c) is at least one of a polyvinyl butyl resin, an epoxy resin, and an acrylic resin, the storage stability of the material before curing is particularly excellent. Besides, in the case that when the above-described (d) has a dimethylsilyl group or a trimethylsilyl group on the surface, the compatibility between the silicone rubber and the above-described (d) is improved, the dispersibility of the microcapsule catalyst in the silicone rubber composition is improved, and thus the variation of the product hardness is further suppressed. Besides, in the case that when the content of the above-described (d) is within the specified range, the effect of suppressing the variation of the product hardness and the effect of being excellent in fluidity of the material before curing are well-balanced.

In addition, according to the method for manufacturing an conductive roll for electrophotographic device of the present disclosure, because the molding temperature for molding the cross-linked product of the above silicone rubber composition is within a range of 80 to 130° C., and the molding time is within a range of 5 to 100 seconds, the swelling of the product end portion and the variation of the product hardness are suppressed, and the fluidity and the storage stability of the material before curing are excellent.

A conductive roll for electrophotographic device (hereinafter may be simply referred to as conductive roll) according to the present disclosure is described specifically.

A conductive roll 10 includes a shaft body 12 and an elastic body layer 14 formed on an outer periphery of the shaft body 12. The elastic body layer 14 is a layer (base layer) serving as a base for the conductive roll 10. The elastic body layer 14 is made of a non-foamed elastic body (solid elastic body). The conductive roll 10 can be suitably used as a conductive roll such as a charging roll, a developing roll, a transfer roll, a toner supply roll or the like of an electrophotographic device such as a copying machine, a printer, or a facsimile which employs electrophotography.

The elastic body layer 14 is made of a cross-linked product of a silicone rubber composition containing the following (a) to (d). A secondary particle diameter of the following (d) in the elastic body layer 14 is within a range of 100 to 500 nm.

(a) an organopolysiloxane
(b) a crosslinking agent
(c) a microcapsule catalyst made of fine resin particles which encapsulate a crosslinking catalyst by a resin other than a silicone resin
(d) silica having a BET specific surface area of 70 to 350 m$^2$/g The organopolysiloxane (a) is an organopolysiloxane having at least two functional groups which are cross-linked by the crosslinking agent (b) in one molecule. The functional group-containing organopolysiloxane may be alkenyl group-containing organopolysiloxane, hydroxyl group-containing organopolysiloxane, (meth)acryl group-containing organopolysiloxane, isocyanato-containing organopolysiloxane, amino group-containing organopolysiloxane, epoxy group-containing organopolysiloxane, and the like. In particular, the alkenyl group-containing organopolysiloxane is preferably. The alkenyl group-containing organopolysiloxane is used, for example, as a main raw material of an addition-curable silicone rubber composition. The alkenyl group-containing organopolysiloxane is cross-linked by a hydrosilyl crosslinking agent in an addition reaction with the hydrosilyl crosslinking agent. The alkenyl group may be a vinyl group, an allyl group, a butenyl group, a pentenyl group, a hexenyl group, and the like.

The organopolysiloxane has an organic group in addition to the above functional groups. The organic group is a monovalent substituted or unsubstituted hydrocarbon group. The unsubstituted hydrocarbon group may be an alkyl group such as a methyl group, an ethyl group, a propyl group, a butyl group, a hexyl group, and a dodecyl group, an aryl group such as a phenyl group, an aralkyl group such as a ß-phenylethyl group, a ß-phenylpropyl group, and the like. The substituted hydrocarbon group may be a chloromethyl group, a 3,3,3-trifluoropropyl group, and the like. The organopolysiloxane usually has a methyl group as an organic group and is often used because of easiness of synthesis and the like. A linear organopolysiloxane is preferable; however, the organopolysiloxane may also be branched or cyclic.

The crosslinking agent (b) is a crosslinking agent for crosslinking the organopolysiloxane (a). The crosslinking agent (b) may be a hydrosilyl crosslinking agent, a peroxide crosslinking agent and the like. In particular, the hydrosilyl crosslinking agent is preferable.

The hydrosilyl crosslinking agent is used as a crosslinking agent for an addition-curable silicone rubber composition. The hydrosilyl crosslinking agent has hydrosilyl groups (SiH groups) in the molecular structure thereof. The hydrosilyl crosslinking agent is a hydrosilyl group-containing organopolysiloxane (organohydrogen polysiloxane). The number of the hydrosilyl groups in the molecular structure is not particularly limited and is preferably within a range of 2 to 50 from a viewpoint of being excellent in curing speed, being excellent in stability, and the like. When the molecular structure has two or more hydrosilyl groups, the hydrosilyl groups are preferably present in different Si. The polysiloxane may have a chain structure or a cyclic structure. The hydrosilyl group-containing organopolysiloxane preferably has at least two hydrosilyl groups in one molecule. The hydrosilyl crosslinking agent preferably has a number average molecular weight within a range of 200 to 30000 from a viewpoint of being excellent in handling performance.

Specifically, the hydrosilyl group-containing organopolysiloxane (organohydrogen polysiloxane) may be methylhydrogenpolysiloxane with both ends blocked by trimethylsiloxy group, dimethylsiloxane-methylhydrogensiloxane copolymer with both ends blocked by trimethylsiloxy group, dimethylpolysiloxane with both ends blocked by dimethylhydrogensiloxy group, dimethylsiloxane-methylhydrogensiloxane copolymer with both ends blocked by dimethylhydrogensiloxy group, methylhydrogensiloxane-diphenylsiloxane copolymer with both ends blocked by trimethylsiloxy group, methylhydrogensiloxane-diphenylsiloxane-dimethylsiloxane copolymer with both ends blocked by trimethylsiloxy group, a copolymer comprising ½ unit of $(CH_3)_2HSiO$ and 4/2 unit of SiO, a copolymer comprising ½ unit of $(CH_3)_2HSiO$, 4/2 unit of SiO, and 3/2 unit of $(C_6H_5)SiO$, and the like.

A blending amount of the hydrosilyl crosslinking agent is not particularly limited and is usually in a range of 0.1 to 40 parts by mass with respect to 100 parts by mass of the alkenyl group-containing organopolysiloxane.

An organic peroxide may be benzoyl peroxide, 2,4-dichlorobenzoyl peroxide, p-methylbenzoyl peroxide, o-methylbenzoyl peroxide, dicumyl peroxide, cumyl-t-butyl peroxide, 2,5-dimethyl-2,5-di-t-butyl peroxyhexane, di-t-butyl peroxide, and the like. In particular, in terms of imparting particularly low compression permanent set deformation, dicumyl peroxide, cumyl-t-butyl peroxide, 2,5-dimethyl-2,5-di-t-butyl peroxyhexane, di-t-butyl peroxide are preferable.

An addition amount of the organic peroxide is not particularly limited and is usually in a range of 0.1 to 10 parts by mass with respect to 100 parts by mass of the alkenyl group-containing organopolysiloxane.

The crosslinking catalyst in (c) is a catalyst accelerating the crosslinking reaction of the organopolysiloxane (a) caused by the crosslinking agent (b). The crosslinking catalyst in (c) may be a platinum catalyst, a ruthenium catalyst, a rhodium catalyst and the like serving as a hydrosilylation catalyst. The platinum catalyst may be fine particle platinum, platinum black, platinum on activated carbon, platinum on silica, chloroplatinic acid, alcohol solution of chloroplatinic acid, olefin complex of platinum, alkenylsiloxane complex of platinum, and the like. These may be used alone or in combination of two or more.

The crosslinking catalyst in (c) is microencapsulated with a resin. The microcapsule catalyst (microencapsulated catalyst) is made of fine resin particles encapsulating the crosslinking catalyst. The fine resin particles which encapsulate the crosslinking catalyst are solid at least at room temperature and have an average particle diameter of 30 μm or less. The average particle diameter is measured with a laser microscope. From a viewpoint of increasing dispersibility of the crosslinking catalyst, the average particle diameter of the fine resin particles encapsulating the crosslinking catalyst is preferably 10 μm or less, and more preferably 7.0 μm or less. In addition, from a viewpoint of increasing a recovery rate of the fine particles at the time of manufacturing, the average particle diameter of the fine resin particles is preferably 0.1 μm or more, and more preferably 2.0 μm or more.

The resin (coating resin) of the microcapsule catalyst is a resin other than a silicone resin. The reason is to suppress that the resin of microcapsule catalyst swells in the silicone rubber composition during pre-use preservation (storage), the encapsulated crosslinking catalyst diffuses into the silicone rubber composition, and the crosslinking reaction of the organopolysiloxane (a) proceeds. In addition, from this viewpoint, the resin of the microcapsule catalyst is preferably a resin having low compatibility with the organopolysiloxane (a). Specifically, a resin which has a solubility parameter greatly deviating from a solubility parameter of the organopolysiloxane (a) is preferable. The solubility parameter (SP value) of the resin of the microcapsule catalyst is preferably 7.9 or more, more preferably 8.3 or more, and still more preferably 9.0 or more. On the other hand, an upper limit of the solubility parameter of the resin of the microcapsule catalyst is not particularly limited and may be, for example, 20 or less. The solubility parameter can be calculated from the molecular structure by Small calculation method.

The resin of the microcapsule catalyst may be either a thermoplastic resin or a thermosetting resin. The resin of the microcapsule catalyst is more preferably a thermosetting resin from a viewpoint of suppressing the reduction in the compression permanent set deformation by crosslinking.

The resin of the microcapsule catalyst is not particularly limited and preferably has a glass transition temperature (Tg) of 40 to 145° C. The glass transition temperature (Tg) of the thermosetting resin is a value before thermosetting. By setting the glass transition temperature to 145° C. or lower and setting a difference between the heating temperature and the melting temperature of the resin, the resin starts to melt at an earlier stage during heating (during reaction) and improvement of crosslinking reactivity due to increase of a diffusion amount of the crosslinking catalyst can be realized. In this case, if the glass transition temperature is 100° C. or less or 85° C. or less, even in a low temperature crosslinking reaction of 120° C. or 100° C. for example, the resin starts to melt at an earlier stage and the improvement of the crosslinking reactivity due to the increase of the diffusion amount of the crosslinking catalyst can be realized, and thus the crosslinking reactivity at a low temperature is also excellent. However, in order to prevent the resin from softening and melting at room temperature and impairing storage stability, the glass transition temperature is preferably 40° C. or more. More preferably, the glass transition temperature is 45° C. or more or 50° C. or more. The glass transition temperature can be measured by DSC (differential scanning calorimetry).

The resin of the microcapsule catalyst is not particularly limited and preferably has a thermal conductivity of 0.16 W/m·K or more. By making the thermal conductivity of the resin of the microcapsule catalyst higher than the thermal conductivity of the organopolysiloxane (a), a melting speed of the resin during heating (during reaction) is increased, and the improvement of the crosslinking reactivity due to diffusivity improvement of the crosslinking catalyst can be realized. By setting the thermal conductivity to 0.17 W/m·K or more, and further to 0.20 W/m·K or more, the crosslinking reactivity can be significantly improved. The thermal conductivity can be measured according to ASTM C177.

The resin of the microcapsule catalyst may be an epoxy resin, an acrylic resin, a polyvinyl butyl resin, a styrene-based polymer, a polycarbonate resin, an unsaturated polyester resin, an alkyd resin, a urea resin, a melamine resin, a vinyl chloride resin, a polyurethane resin, a polyether sulfone resin, a polysulfone resin, a polyphenylene sulfide resin, a phenol resin, a diallyl phthalate resin, a polyvinyl alcohol resin, a hydrogenated terpene resin, and the like. These resins may be used alone or may be used in combination of two or more as the resin of the microcapsule catalyst. The thermosetting resin may be a polyvinyl butyral resin, an epoxy resin, an unsaturated polyester resin, a phenol resin, a resol resin, an alkyd resin, a urea resin, a melamine resin, a polyurethane resin, a diallyl phthalate resin, an acrylic resin, and the like. From a viewpoint of not impairing the reactivity of the crosslinking catalyst, the resin of the microcapsule catalyst more preferably does not comprise a nitrogen compound such as amine and amide, or a compound of phosphorus, sulfur and the like in the resin composition. Because the same kind of resin includes resins having different solubility parameters or different glass transition temperatures, even when an arbitrary kind of resin is used alone as the resin of the microcapsule catalyst, materials having different physical property values can be combined and adjusted to a predetermined physical property value. In addition, when two or more kinds of the above resins are used in combination as the resin of the microcapsule catalyst, materials having different physical property values can also be combined and adjusted to a predetermined physical property value. Among the above resins, the epoxy resin, the acrylic resin, the polyvinyl butyral resin, and the unsaturated polyester resin are more preferably. These resins have relatively low compatibility with the organopolysiloxane (a) and are particularly excellent in storage stability of the material before curing.

The acrylic resin includes both a polymer comprising acrylate as a monomer and a polymer comprising methacrylate as a monomer. In addition, the acrylic resin also includes a polymer comprising acrylate and methacrylate as monomers. In particular, from a viewpoint of being capable of maintaining a solid state at room temperature, the polymer comprising acrylate and methacrylate as monomers and a polymer comprising only methacrylate as a monomer are more preferable. The acrylic resin may be a homopolymer synthesized from a single monomer or a copolymer synthesized from two or more kinds of monomers. The acrylic resin is preferably a copolymer from a viewpoint of easily adjusting the glass transition temperature to a low temperature of 100° C. or less or 85° C. or less. Among acrylic resins, from a viewpoint of being capable of setting the glass transition temperature to a low temperature of 85° C. or less, a copolymer of ethyl methacrylate and methyl methacrylate is particularly preferable.

An acrylic monomer and a methacrylic monomer may be an alkyl (meth)acrylate, a cycloalkyl (meth)acrylate, a halogenated alkyl (meth)acrylate, a (meth)acrylate having a hydroxyl group, an alkoxy alkyl (meth)acrylate, a phenoxyalkyl (meth)acrylate, an alkoxy alkyleneglycol (meth)acrylate, and the like. Specifically, the acrylic monomer and the methacrylic monomer may be an alkyl (meth)acrylate such as methyl (meth)acrylate, ethyl (meth)acrylate, propyl (meth)acrylate, butyl (meth)acrylate, isoamyl (meth)acrylate, 2-ethylhexyl (meth)acrylate, lauryl (meth)acrylate, stearyl (meth)acrylate, and the like; a cycloalkyl (meth) acrylate such as cyclohexyl (meth)acrylate and the like; a halogenated alkyl (meth)acrylate such as chloroethyl (meth) acrylate, chloropropyl (meth)acrylate, and the like; a (meth) acrylate having a hydroxyl group such as 2-hydroxyethyl (meth)acrylate, 2-hydroxypropyl (meth)acrylate, 2-hydroxybutyl (meth)acrylate, 3-chloro-2-hydroxypropyl (meth)acrylate, ß-hydroxy-ß'-(meth)acryloyloxyethyl phthalate, and the like; an alkoxy alkyl (meth)acrylate such as methoxyethyl (meth)acrylate, ethoxyethyl (meth)acrylate, butoxyethyl (meth)acrylate, and the like; a phenoxyalkyl (meth)acrylate such as phenoxyethyl acrylate, nonylphenoxyethyl (meth)acrylate, and the like; an alkoxy alkyleneglycol (meth)acrylate such as ethoxy diethylene glycol (meth)acrylate, methoxy triethylene glycol (meth)acrylate, methoxy dipropylene glycol (meth)acrylate, and the like; 2, 2-dimethylaminoethyl (meth)acrylate, 2,2-diethylaminoethyl (meth)acrylate, 2-hydroxyethyl (meth)acrylate, 3-chloro-2-hydroxypropyl (meth)acrylate, and the like.

In addition, the acrylic monomer and the methacrylic monomer may be an alkyl diol di(meth)acrylate such as 1,9-nonanediol di(meth)acrylate and the like; a polyethylene glycol di(meth)acrylate such as diethylglycol di(meth)acrylate and the like; a polypropylene glycol di(meth)acrylate such as dipropylene glycol di(meth)acrylate and the like; trimethylol propane tri(meth)acrylate; pentaerythritol tri (meth)acrylate; pentaerythritol tetra(meth)acrylate, glycerol tri(meth)acrylate; a multivalent (meth)acrylate which is obtained by an addition reaction between ethylene glycol diglycidyl ether and a compound having an unsaturated ethylene bond and active hydrogen, such as an unsaturated carboxylic acid and an unsaturated alcohol; a multivalent (meth)acrylate such as glycidyl (meth)acrylate which is obtained by an addition reaction of an unsaturated epoxy compound and a compound having active hydrogen such as carboxylic acid or amine; a multivalent (meth)acrylic amide such as methylenebis (meth)acrylic amide or the like; a multivalent vinyl compound such as divinylbenzene or the like; and the like.

The styrene-based polymer may be a homopolymer synthesized from a single monomer or a copolymer synthesized from two or more monomers. The styrene-based polymer is preferably a copolymer. The styrene-based polymer may be a styrene-maleic anhydride copolymer (SMA), a styrene-butadiene copolymer (SBS), a styrene-isoprene copolymer (SIS), a hydrogenated styrene-butadiene copolymer (SEBS), a hydrogenated styrene-isoprene copolymer (SEPS), a styrene-acrylonitrile copolymer (SAN), an acrylonitrile-butadiene-styrene copolymer (ABS), and the like.

The microcapsule catalyst can be produced by a conventionally known method. From a viewpoint of productivity, sphericity and the like, suspension polymerization, emulsion polymerization, a spray dryer method, in-liquid drying, and the like are preferable.

When the microcapsule catalyst is manufactured by suspension polymerization or emulsion polymerization, the crosslinking catalyst is made into a solid core substance and dispersed in an organic solvent in which the crosslinking catalyst is not dissolved, and the monomer is polymerized in the dispersion liquid by polymerization such as suspension polymerization or emulsion polymerization method, thereby coating a surface of the core substance by the polymer. Accordingly, the microcapsule catalyst in which the crosslinking catalyst is encapsulated by the fine resin particles is obtained.

When the microcapsule catalyst is manufactured by in-liquid drying, the crosslinking catalyst and the resin to be encapsulated are dissolved in a water-insoluble organic solvent, and the solution is added drop-wise to an aqueous solution of a surfactant to make an emulsion. Thereafter, the pressure is reduced to remove the organic solvent, and the encapsulated catalyst is obtained by filtration.

A metal atom content of the crosslinking catalyst in the microcapsule catalyst is preferably 5 mass % or less from a viewpoint of being sufficiently covered with the resin and being capable of ensuring excellent storage stability. The metal atom content is more preferably 2 mass % or less. In addition, from a viewpoint of ensuring excellent catalyst activity, the metal atom content is preferably 0.01 mass % or more, and more preferably 0.1 mass % or more.

A content of the microcapsule catalyst in the silicone rubber composition also depends on a content of the crosslinking catalyst in the microcapsule catalyst, and when the content of the crosslinking catalyst in the microcapsule catalyst is within the above predetermined range, the content of the microcapsule catalyst in the silicone rubber composition can be within a range of 0.01 to 5.0 parts by mass with respect to 100 parts by mass of the organopolysiloxane (a). In addition, when the crosslinking catalyst is a metal catalyst, in terms of a metal amount, the content of the microcapsule catalyst is usually in a range of 1 ppm 1.0 part by mass with respect to 100 parts by mass of the organopolysiloxane (a).

Silica having a BET specific surface area of 70 to 350 $m^2/g$ is used as the silica (d). If the BET specific surface area of the silica used is less than 70 $m^2/g$ and the surface area is too small, an interaction with the microcapsule catalyst (c) is small, and the dispersibility of the microcapsule catalyst (c) is reduced. Accordingly, hardness variation of the elastic body layer 14 occurs. In addition, if the BET specific surface area of the silica used is more than 350 $m^2/g$ and the surface area is too great, fluidity of the material before curing is reduced. In addition, from a viewpoint of being more excellent in the effect of suppressing the hardness variation of the elastic body layer 14, the BET specific surface area of the silica used is more preferably 90 $m^2/g$ or more and particularly preferably 130 $m^2/g$ or more. In addition, from a viewpoint of being more excellent in the fluidity of the material before curing, the BET specific surface area of the silica used is more preferably 300 $m^2/g$ or less.

A primary particle diameter of the silica (d) is preferably within a range of 7.0 to 20 nm, and more preferably within a range of 7.0 to 16 nm. The primary particle diameter of the silica can be measured by a laser microscope.

A content of the silica (d) is preferably within a range of 3.0 to 35 parts by mass with respect to 100 parts by mass of the organopolysiloxane (a), and more preferably within a range of 5.0 to 30 parts by mass. If the content of the silica (d) is 3.0 parts by mass or more with respect to 100 parts by mass of the organopolysiloxane (a), the hardness variation of the elastic body layer 14 is easily suppressed. If the content of the silica (d) is 35 parts by mass or less with respect to 100 parts by mass of the organopolysiloxane (a), the reduction of the fluidity of the material before curing is easily suppressed.

The silica (d) may be surface-treated by a surface treatment agent or may not be surface-treated. The surface treatment agent may be a silylating agent, dimethylpolysiloxane and the like. For example, if the silica (d) is surface-treated by a predetermined silylating agent, the silica (d) can have a hydrophobic group such as a dimethylsilyl group or a trimethylsilyl group on a surface. If the silica (d) has a hydrophobic group such as a dimethylsilyl group or a trimethylsilyl group on a surface, compatibility with the organopolysiloxane (a) is improved, and the dispersibility of the microcapsule catalyst (c) is improved via the silica (d). Thereby, the hardness variation of the elastic body layer 14 can be further suppressed.

Regarding the silicone rubber composition, additives that can be added to the silicone rubber can be added as necessary within a range that does not impair the present disclosure. The additives may be a reinforcing material, a conductive agent, a filler, a crosslinking accelerator, a crosslinking retarder, a crosslinking aid, a scorch inhibitor, an antioxidant, a softener, a plasticizer, a lubricant, a heat stabilizer, a flame retardant, a flame retardant aid, an UV absorber, an anti-soaking agent, and the like. The conductive agent may be a conventionally known conductive agent such as an electronic conductive agent (carbon black, graphite, c-$TiO_2$, c-ZnO, c-$SnO_2$ (c-means conductivity)), an ionic conductive agent (quaternary ammonium salt, quaternary phosphonium salt, borate salt, surfactant and the like), and the like.

The elastic body layer 14 can be manufactured, for example, as follows. First, the shaft body 12 is coaxially installed in a hollow part of a roll molding die, and an uncross-linked conductive silicone rubber composition is injected and removed from the mold after heating and curing (crosslinking), or the uncross-linked conductive silicone rubber composition is extruded onto the surface of the shaft body 12, thereby forming the elastic body layer 14 on an outer periphery of the shaft body 12.

In the manufacturing of the elastic body layer 14, a molding temperature for molding the cross-linked product of the silicone rubber composition is preferably within a range of 80 to 130° C. In addition, a molding time is preferably within a range of 5 to 100 seconds. By the low temperature molding, the swelling of the product end portion can be suppressed. In the present disclosure, because the crosslinking catalyst of the silicone rubber composition is the above-described microcapsule catalyst, the low temperature molding can be performed in the short time.

In the elastic body layer 14, a secondary particle diameter of the above (d) is within a range of 100 to 500 nm, and preferably within a range of 150 to 400 nm. If the secondary particle diameter of (d) is less than 100 nm, the fluidity of the material is reduced. On the other hand, if the secondary particle diameter of (d) is more than 500 nm, the hardness variation of the product occurs. A size of the secondary particle diameter of (d) in the elastic body layer 14 can be adjusted by a size of the primary particle diameter, the content, dispersion conditions, and the like. The secondary particle diameter of (d) in the elastic body layer 14 can be measured by observing a cross section of the elastic body layer 14. Specifically, the secondary particle diameter of (d) can be measured by a transmission electron microscope.

The elastic body layer 14 can be adjusted to have a predetermined volume resistivity. The volume resistivity of the elastic body layer 14 may be appropriately set in a range of $10^2$ to $10^{10}$ Ω·cm depending on the disclosure or the like.

A thickness of the elastic body layer 14 is not particularly limited and may be appropriately set within a range of 0.1 to 10 mm depending on the disclosure or the like.

The shaft body 12 is not particularly limited as long as it has conductivity. Specifically, a core bar formed of a solid body or a hollow body made of a metal such as iron, stainless steel and aluminum can be exemplified. If necessary, the surface of the shaft body 12 may be coated with an adhesive, a primer, and the like. That is, the elastic body layer 14 may be adhered to the shaft body 12 via an adhesive layer (primer layer). If necessary, the adhesive and the primer may be made conductive.

According to the conductive roll 10 having the above configuration, because the crosslinking catalyst of the silicone rubber composition which forms the elastic body layer 14 is a microcapsule catalyst, the low temperature molding can be performed in a short time, and the swelling of the product end portion can be suppressed. In addition, the storage stability of the material before curing is also excellent. Besides, in the silicone rubber composition, the silica having the specified BET specific surface area is used together with the microcapsule catalyst, and thereby the dispersibility of the microcapsule catalyst in the silicone rubber composition is improved, and the variation of the product hardness is suppressed. In addition, the fluidity of the material before curing is also excellent. The reason is presumed to be that the interaction between the silica having a great BET specific surface area and the microcapsule catalyst is great, and the microcapsule catalyst is highly dispersed via the silica having a great BET specific surface area even in the organopolysiloxane having a low compatibility.

The conductive roll according to the present disclosure may be configured by the shaft body 12 and only one layer of the elastic body layer 14 as shown in FIG. 1, or may be further configured by other layers in addition to the one layer of the elastic body layer 14. Other layers may be a surface layer, an intermediate layer, and the like. The surface layer is a layer that appears on the surface of the conductive roll and is arranged for a purpose of protecting the surface of the conductive roll, imparting surface characteristics, and the like. One or more intermediate layers are arranged between the shaft body 12 and the one layer of the elastic body layer 14, between the one layer of the elastic body layer 14 and the surface layer, and the like. The intermediate layer is arranged for a purpose of improving adhesiveness, preventing diffusion of other components, and the like. When no surface layer is arranged as another layer, the same function as in the case where the surface layer is arranged may be imparted by performing a surface modification treatment for modifying the surface of the elastic body layer 14.

EXAMPLE

The present disclosure is described specifically below with reference to examples and comparison examples.

Materials used are as follows.
Organopolysiloxane (silicone rubber): "DMS-V31" manufactured by Gelest Co., Ltd.
Crosslinking agent: hydrosilyl crosslinking agent ("HMS-501" manufactured by Gelest Co., Ltd.)
Microcapsule catalyst: the following synthesis products
Silica <1>: "AEROSIL 200" manufactured by Nippon Aerosil Co., Ltd. and subjected to a surface treatment using hexamethyl disilazane
Silica <2>: "AEROSIL 90" manufactured by Nippon Aerosil Co., Ltd. and subjected to a surface treatment using hexamethyl disilazane
Silica <3>: "AEROSIL 300" manufactured by Nippon Aerosil Co., Ltd. and subjected to a surface treatment using hexamethyl disilazane
Silica <4>: "AEROSIL 200" manufactured by Nippon Aerosil Co., Ltd. and subjected to a surface treatment using dimethyl dichlorosilazane
Silica <5>: "AEROSIL 200" manufactured by Nippon Aerosil Co., Ltd.
Silica <6>: "AEROSIL 200" manufactured by Nippon Aerosil Co., Ltd. and subjected to a surface treatment using silicone oil
Silica <7>: "AEROSIL 50" manufactured by Nippon Aerosil Co., Ltd. and subjected to a surface treatment using hexamethyl disilazane
Silica <8>: "AEROSIL 380" manufactured by Nippon Aerosil Co., Ltd. and subjected to a surface treatment using hexamethyl disilazane
Additive: conductive agent ("Denka Black HS-100" manufactured by Denka Co., Ltd.)

[Manufacturing of Microcapsule Catalyst]

20 mass % xylene solution of platinum catalyst, each coating resin used for encapsulation, and acetone were mixed at a ratio (mass ratio) of 0.6:5:95, and the resultant solution was sprayed into a spray dryer tank at 70° C. under a nitrogen atmosphere so as to obtain fine particles containing the coating resin and the platinum catalyst. Thereby, a microcapsule catalyst having a predetermined average particle diameter was manufacture. The average particle diameter of the microcapsule catalyst was measured by a laser microscope.

Platinum catalyst: chloroplatinic (IV) acid, manufactured by Furuya Metal Co., Ltd.
Coating Resin:
<1> Unsaturated polyester resin: "UE-3350" manufactured by Unitika (Tg=52° C., SP value 10.7)
<2> Epoxy resin: "jER1001" manufactured by Mitsubishi Chemical (Tg=52° C., SP value 10.9)
<3> Polyvinyl butyral (PVB): "Mowital B30HH" manufactured by Kuraray (Tg=59° C., SP value 9.5)
<4> Acrylic resin: "Hi-Pearl T-8252" manufactured by Negami Kogyo (Tg=81° C., SP value 9.8)
<5> Polystyrene resin: "YS Resin SX100" manufactured by Yasuhara Chemical (Tg=60° C., SP value 8.6)
<6> Silicone resin: "YR3370" manufactured by Tanak (Tg=77° C., SP value 7.5)

The solubility parameter (SP value) and the glass transition temperature (Tg) of the coating resin of the microcapsule catalyst were measured by the following methods.

(Solubility Parameter (SP Value))

The SP value was estimated from the molecular structure by Small calculation method. Calculation formula: $\delta = \rho \Sigma Fi/M$ ($\delta$: compatibility parameter, $\rho$: specific gravity of resin, M: molecular weight of structural unit of resin, Fi: molar attraction constant)

(Glass Transition Temperature (Tg))

A temperature of an endothermic peak showing the glass transition point of the resin was confirmed by DSC measurement (differential scanning calorimetry). The DSC measurement was performed under a nitrogen gas atmosphere at a temperature rising speed of 20° C./min.

<Preparation of Silicone Rubber Composition>

Examples 1 to 17, Comparison Examples 2, 4 to 6

100 parts by mass of the organopolysiloxane, 0.42 part by mass of the microcapsule catalyst, 10 parts by mass of the conductive agent, and a predetermined amount of the silica were blended and then mixed in a planetary mixer for 30 minutes. Subsequently, after 3.0 parts by mass of the crosslinking agent were blended, they were further mixed for 30 minutes and defoamed under reduced pressure, and a liquid addition-curable silicone rubber composition was prepared.

<Manufacturing of Elastic Body Layer>

The silicone rubber composition was filled in a mold in which a core metal (a diameter of 6 mm, made of SUS304) serving as a shaft body was set, and then heat crosslinking was performed under predetermined conditions (temperature, time) shown in the table. Thereafter, the molded product was removed from the mold, the rubber end portion was cut into a predetermined size, and a roll-shaped elastic body layer (a thickness of 3 mm) made of conductive silicone rubber was formed along an outer peripheral surface of the shaft body. As described above, a conductive roll was manufactured.

Comparison Example 1

A conductive roll was manufacture similarly as in Example 1 except that a non-microcapsule catalyst (chloroplatinic acid, 20 mass % of xylene solution manufactured by Furuya Metal Co., Ltd.) was used instead of the microcapsule catalyst in the preparation of the silicone rubber composition.

Comparison Example 3

A conductive roll was manufactured similarly as in Example 1 except that the predetermined silica was not blended in the preparation of the silicone rubber composition.

The value of the BET specific surface area and the primary particle diameter of the silica used are catalog values. The secondary particle diameter of the silica is the secondary particle diameter of the silica in the elastic body layer and is a measured value.

(Secondary Particle Diameter of Silica)

Three locations on the cross section of the elastic body layer were measured using a transmission electron microscope (TEM), and the average value was taken as the secondary particle diameter of the silica.

Storage stability, material fluidity, and curability were evaluated for the prepared silicone rubber composition. In addition, hardness variation and swelling of the product end portion were evaluated for the manufactured conductive roll.

(Storage Stability)

The prepared silicone rubber composition was mixed until there was no difference in the dispersion state and was left at room temperature. The storage stability was judged, by touching with hands, according to whether the prepared silicone rubber composition was cured. A case where the prepared silicone rubber composition is not cured for one week or more is regarded as particularly good "⊚", a case where the prepared silicone rubber composition is not cured for three days or more is regarded as good "○", a case where the prepared silicone rubber composition is not cured for one day or more is regarded as fair "Δ", and a case where the prepared silicone rubber composition is cured immediately is regarded as poor "x".

(Hardness Variation)

The surface hardness was measured by an Acker C hardness meter at 8 points at a pitch of 45° in a circumferential direction at a distance of 10 mm in the axial direction from the axial end portion of the elastic body layer, and the variation in hardness was obtained. A case where the variation in hardness is within ±0.5 from the average value is regarded as particularly good "⊚", a case where the variation in hardness is within ±1.0 is regarded as good "○", a case where the variation in hardness is less than ±1.5 is regarded as fair "Δ", and a case where the variation in hardness is ±1.5 or more is regarded as poor "x".

(Material Fluidity)

For the prepared silicone rubber composition, the material fluidity is measured at 2 cm 2° cone/a gap distance of 50 μm/an equilibrium flow mode using "AR500 rheometer" manufactured by TA Instruments Japan Inc. and represented as a read-out value of Shear rate 10 (1/s). A case where the Shear rate is less than 1000 Pa·s is regarded as particularly good "⊚", a case where the Shear rate is 1000 Pas or more and less than 2000 Pa·s is regarded as good "○", a case where the Shear rate is 2000 Pa·s or more and less than 3000 Pa·s is regarded as fair "Δ", and a case where the Shear rate is 3000 Pa·s or more is regarded as poor "x".

(Curing Time)

In the manufacturing of the elastic body layer, a case where the curing time of the silicone rubber composition is within 20 seconds is regarded as particularly good "⊚", a case where the curing time of the silicone rubber composition is more than 20 seconds and within 30 seconds is regarded as good "○", a case where the curing time of the silicone rubber composition is more than 30 seconds and within 100 seconds is regarded as fair "Δ", and a case where the curing time of the silicone rubber composition is more than 100 seconds is regarded as poor "x".

(Swelling of Product End Portion)

The swelling of the product end portion is evaluated by a percentage of an outer diameter difference between a position of 0.5 mm and a position of 10 mm in the axial direction from the axial end portion of the elastic body layer with respect to a thickness at the position of 10 mm from the axial end portion of the elastic body layer. A case where the percentage is 4.0% or less is regarded as particularly good "⊚", a case where the percentage is more than 4.0% and 5.5% or less is regarded as good "○", a case where the percentage is more than 5.5% and 6.0% or less is regarded as fair "Δ", and a case where the percentage is more than 6.0% is regarded as poor "x".

TABLE 1

| | | | Example | | | | | | | | |
|---|---|---|---|---|---|---|---|---|---|---|---|
| | | | 1 | 2 | 3 | 4 | 5 | 6 | 7 | 8 | 9 |
| Organopolysiloxane | | | 100 | 100 | 100 | 100 | 100 | 100 | 100 | 100 | 100 |
| Crosslinking agent [phr] | | | 3.0 | 3.0 | 3.0 | 3.0 | 3.0 | 3.0 | 3.0 | 3.0 | 3.0 |
| MC catalyst | No. | | <1> | <2> | <3> | <4> | <5> | <1> | <1> | <1> | <1> |
| | Coating resin | | Polyester | Epoxy | PVB | Acrylic | Polystyrene | Polyester | Polyester | Polyester | Polyester |
| | Average particle diameter [μm] | | 4.2 | 6.8 | 6.1 | 5.6 | 3.8 | 4.2 | 4.2 | 4.2 | 4.2 |
| | Addition amount [phr] | | 0.42 | 0.42 | 0.42 | 0.42 | 0.42 | 0.42 | 0.42 | 0.42 | 0.42 |
| Silica | No. | | <1> | <1> | <1> | <1> | <1> | <2> | <3> | <1> | <1> |
| | Specific surface area [m²/g] | | 200 | 200 | 200 | 200 | 200 | 90 | 300 | 200 | 200 |
| | Primary particle diameter [nm] | | 12 | 12 | 12 | 12 | 12 | 20 | 7 | 12 | 12 |
| | Secondary particle diameter [nm] | | 252 | 254 | 258 | 232 | 266 | 302 | 280 | 118 | 186 |
| | Addition amount [phr] | | 10 | 10 | 10 | 10 | 10 | 10 | 10 | 1 | 3 |
| | Surface treatment | | Trimethyl-silyl | Trimethyl-silyl | Trimethyl-silyl | Trimethyl-silyl | Trimethyl-silyl | Trimethyl-silyl | Trimethyl-silyl | Trimethyl-silyl | Trimethyl-silyl |
| Condition | Temperature [° C.] | | 100 | 100 | 100 | 100 | 100 | 100 | 100 | 100 | 100 |
| | Time [s] | | 20 | 20 | 20 | 20 | 20 | 20 | 20 | 20 | 20 |
| Evaluation | Storage stability | | ⊚ | ⊚ | ⊚ | ⊚ | Δ | ⊚ | ⊚ | ⊚ | ⊚ |
| | Hardness variation | | ⊚ | ⊚ | ⊚ | ⊚ | ⊚ | ○ | ⊚ | Δ | ○ |
| | Material fluidity | | ⊚ | ⊚ | ⊚ | ⊚ | ⊚ | ⊚ | ○ | ⊚ | ⊚ |
| | Curability | | ⊚ | ⊚ | ⊚ | ○ | ⊚ | ⊚ | ⊚ | ⊚ | ⊚ |

TABLE 1-continued

| | | Example | | | | | | | | |
|---|---|---|---|---|---|---|---|---|---|---|
| | | 1 | 2 | 3 | 4 | 5 | 6 | 7 | 8 | 9 |
| Swelling of product end portion | | ◎ | ◎ | ◎ | ◎ | ◎ | ◎ | ◎ | ◎ | ◎ |

TABLE 2

| | | Example | | | | | | | |
|---|---|---|---|---|---|---|---|---|---|
| | | 10 | 11 | 12 | 13 | 14 | 15 | 16 | 17 |
| Organopolysiloxane | | 100 | 100 | 100 | 100 | 100 | 100 | 100 | 100 |
| Crosslinking agent [phr] | | 3.0 | 3.0 | 3.0 | 3.0 | 3.0 | 3.0 | 3.0 | 3.0 |
| MC catalyst | No. | <1> | <1> | <1> | <1> | <1> | <1> | <1> | <1> |
| | Coating resin | Polyester | Polyester | Polyester | Polyester | Polyester | Polyester | Polyester | Polyester |
| | Average particle diameter [μm] | 4.2 | 4.2 | 4.2 | 4.2 | 4.2 | 4.2 | 4.2 | 4.2 |
| | Addition amount [phr] | 0.42 | 0.42 | 0.42 | 0.42 | 0.42 | 0.42 | 0.42 | 0.42 |
| Silica | No. | <1> | <1> | <4> | <1> | <1> | <1> | <5> | <6> |
| | Specific surface area [$m^2$/g] | 200 | 200 | 200 | 200 | 200 | 200 | 200 | 200 |
| | Primary particle diameter [nm] | 12 | 12 | 12 | 12 | 12 | 12 | 12 | 12 |
| | Secondary particle diameter [nm] | 486 | 434 | 230 | 252 | 272 | 236 | 485 | 432 |
| | Addition amount [phr] | 35 | 40 | 10 | 10 | 10 | 10 | 10 | 10 |
| | Surface treatment | Trimethyl-silyl | Trimethyl-silyl | Dimethyl-silyl | Trimethyl-silyl | Trimethyl-silyl | Trimethyl-silyl | Untreated | Dimethylpoly-siloxane |
| Condition | Temperature [° C.] | 100 | 100 | 100 | 70 | 80 | 130 | 100 | 100 |
| | Time [s] | 20 | 20 | 20 | 60 | 30 | 5 | 20 | 20 |
| Evaluation | Storage stability | ◎ | ◎ | ◎ | ◎ | ◎ | ◎ | ◎ | ◎ |
| | Hardness variation | ◎ | ◎ | ○ | ◎ | ◎ | ◎ | Δ | Δ |
| | Material fluidity | ○ | Δ | ◎ | ◎ | ◎ | ◎ | Δ | Δ |
| | Curability | ◎ | ◎ | ◎ | Δ | ◎ | ◎ | ◎ | ◎ |
| | Swelling of product end portion | ◎ | ◎ | ◎ | ◎ | ◎ | ○ | ◎ | ◎ |

TABLE 3

| | | Comparison example | | | | | |
|---|---|---|---|---|---|---|---|
| | | 1 | 2 | 3 | 4 | 5 | 6 |
| Organopolysiloxane | | 100 | 100 | 100 | 100 | 100 | 100 |
| Crosslinking agent [phr] | | 3.0 | 3.0 | 3.0 | 3.0 | 3.0 | 3.0 |
| MC catalyst | No. | — | <6> | <1> | <1> | <1> | <1> |
| | Coating resin | — | Silicone | Polyester | Polyester | Polyester | Polyester |
| | Average particle diameter [μm] | — | 4.3 | 4.2 | 4.2 | 4.2 | 4.2 |
| | Addition amount [phr] | — | 0.42 | 0.42 | 0.42 | 0.42 | 0.42 |
| Non-MC scatalyst | Chloroplatinic acid | 0.05 | — | — | — | — | — |

TABLE 3-continued

|  |  | Comparison example | | | | | |
|---|---|---|---|---|---|---|---|
|  |  | 1 | 2 | 3 | 4 | 5 | 6 |
| Silica | No. | <1> | <1> | — | <7> | <8> | <1> |
|  | Specific surface area [m²/g] | 200 | 200 | — | 50 | 380 | 200 |
|  | Primary particle diameter [nm] | 12 | 12 | — | 30 | 5 | 12 |
|  | Secondary particle diameter [nm] | 252 | 248 | — | 368 | 272 | 1027 |
|  | Addition amount [phr] | 10 | 10 | — | 10 | 10 | 10 |
|  | Surface treatment | Trimethylsilyl | Trimethylsilyl | — | Trimethylsilyl | Trimethylsilyl | Trimethylsilyl |
| Condition | Temperature [° C.] | 150 | — | 100 | 100 | 100 | 100 |
|  | Time [s] | 50 | — | 20 | 20 | 20 | 20 |
| Evaluation | Storage stability | ○ | X | ◎ | ◎ | ◎ | ◎ |
|  | Hardness variation | ◎ | — | X | X | ◎ | X |
|  | Material fluidity | ◎ | — | ◎ | ◎ | X | ◎ |
|  | Curability | ○ | — | ◎ | ◎ | ◎ | ◎ |
|  | Swelling of product end portion | X | — | ◎ | ◎ | ◎ | ◎ |

In Comparison example 1, the crosslinking catalyst is not a microcapsule catalyst. Thus, the low temperature molding cannot be performed in a short time, and the swelling of the product end portion cannot be suppressed. In Comparison example 2, the coating resin of the microcapsule catalyst is the silicone resin. Thus, the storage stability was poor and various evaluations cannot be performed. In Comparison example 3, the silica is not blended to the silicone rubber composition. Thus, the dispersibility of the microcapsule catalyst is poor, and the hardness variation is great. In Comparison example 4, the BET specific surface area of the silica is too small. Thus, the interaction between the silica and the microcapsule catalyst is presumed to be small, the dispersibility of the microcapsule catalyst is poor, and the hardness variation is great. In Comparison example 5, the BET specific surface area of the silica is too great. Thus, the material fluidity is poor. In Comparison example 6, the secondary particle diameter of the silica in the elastic body layer is too great. Thus, the dispersibility of the silica and the microcapsule catalyst is poor, and the hardness variation is great.

On the other hand, in the examples, the silicone rubber composition forming the elastic body layer includes the organopolysiloxane (a), the crosslinking agent (b), the microcapsule catalyst (c) made of fine resin particles which encapsulate the crosslinking catalyst by a resin other than the silicone resin, and the silica (d) having a BET specific surface area of 70 to 350 m²/g, and the secondary particle diameter of (d) in the elastic body layer is within a range of 100 to 500 nm. Thus, the swelling of the product end portion and the variation of the product hardness can be suppressed, and the fluidity and the storage stability of the material before curing are excellent.

In the above, embodiments and examples of the present disclosure are described, but the present disclosure is not limited to the above-described embodiments and examples, and various modifications can be made within a range not departing from the spirit of the present disclosure.

What is claimed is:

1. A conductive roll for electrophotographic device, comprising a shaft body and a non-foamed elastic body layer formed on an outer periphery of the shaft body, wherein
the elastic body layer is made of a cross-linked product of a silicone rubber composition containing the following (a) to (d), and
a secondary particle diameter of the following (d) in the elastic body layer is within a range of 100 to 500 nm, and the following (d) has a dimethylsilyl group or a trimethylsilyl group on a surface,
(a) an organopolysiloxane
(b) a crosslinking agent
(c) a microcapsule catalyst made of fine resin particles which encapsulate a crosslinking catalyst by a resin other than a silicone resin
(d) silica having a BET specific surface area of 70 to 350 m²/g,
wherein the resin in (c) is a thermosetting resin,
the resin in (c) is at least one of a polyvinyl butyral resin, an epoxy resin, an acrylic resin, and an unsaturated polyester resin,
and a content of (d) is within a range of 3.0 to 35 parts by mass with respect to 100 parts by mass of (a).

* * * * *